United States Patent
Wang

(10) Patent No.: US 10,654,312 B2
(45) Date of Patent: May 19, 2020

(54) WHEEL COVER UNIT FOR FRONT WHEELS OF TRUCKS OR BUSES

(71) Applicant: Shih Feng Wang, Tainan (TW)

(72) Inventor: Shih Feng Wang, Tainan (TW)

(*) Notice: Subject to any disclaimer, the term of this patent is extended or adjusted under 35 U.S.C. 154(b) by 133 days.

(21) Appl. No.: 15/951,132

(22) Filed: Apr. 11, 2018

(65) Prior Publication Data

US 2019/0225011 A1 Jul. 25, 2019

(30) Foreign Application Priority Data

Jan. 25, 2018 (TW) .............................. 107201266 U

(51) Int. Cl.
*B60B 7/04* (2006.01)
*B60B 7/14* (2006.01)
*B60B 7/06* (2006.01)

(52) U.S. Cl.
CPC ............. *B60B 7/04* (2013.01); *B60B 7/068* (2013.01); *B60B 7/14* (2013.01); *B60B 2310/204* (2013.01); *B60B 2320/52* (2013.01); *B60B 2360/32* (2013.01); *B60B 2900/1216* (2013.01); *B60B 2900/572* (2013.01)

(58) Field of Classification Search
CPC .. B60B 7/04; B60B 7/06; B60B 7/066; B60B 7/068
See application file for complete search history.

(56) References Cited

U.S. PATENT DOCUMENTS

| | | | | | |
|---|---|---|---|---|---|
| 4,946,228 | A | * | 8/1990 | Hsu | B60B 7/06 301/108.4 |
| 5,358,313 | A | * | 10/1994 | Polka | B60B 7/04 301/108.4 |
| 5,443,582 | A | * | 8/1995 | Ching | B60B 7/14 301/37.26 |
| 5,645,324 | A | * | 7/1997 | Wright | B60B 7/14 301/108.4 |
| 5,820,225 | A | * | 10/1998 | Ferriss | B60B 7/0013 301/37.371 |
| 6,595,596 | B1 | * | 7/2003 | Polka | B60B 7/02 301/37.102 |
| 7,059,684 | B1 | * | 6/2006 | Polka | B60B 7/04 301/37.371 |
| 2019/0232715 | A1 | * | 8/2019 | Wang | B60B 7/066 |

* cited by examiner

*Primary Examiner* — Jason R Bellinger
(74) *Attorney, Agent, or Firm* — Raymond Y. Chan; David and Raymond Patent Firm

(57) ABSTRACT

A wheel cover unit for front wheels of trucks or buses includes a wheel cover, two attaching members and a cover. The wheel cover is provided with an outer convex platform having a central hole, and the periphery of the central hole is annularly provided with a plurality of nut convex covers and a plurality of through holes. The inner edge of the central hole is vertically and backwardly provided with a hole ring having corresponding two pairs of slots, wherein each slot extends to the central hole with a lock tab. Each attaching member is provided with a connecting portion and two connecting pieces. The connecting portion is locked with the bolt of the wheel and the connecting piece is locked with the lock tab via a screwed element, so as to assemble the wheel cover to the front wheel of the truck or bus.

7 Claims, 6 Drawing Sheets

WHEEL COVER UNIT FOR FRONT WHEELS OF TRUCKS OR BUSES

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a wheel cover unit, and more particularly to a wheel cover unit for front wheels of trucks or buses.

Description of Related Arts

Both sides of a wheel of a truck or bus are an inner concave surface and an outer convex surface, while front wheels of the truck or bus have only one front wheel on each side, so the outer convex surface of the front wheel rim will be located on the outer side of the front wheel for smooth driving. However, two rear wheels are generally installed on each side to increase the stability of the attaching capacity, so the wheels of the rear wheels must be two, and the wheels of the two rear wheels on the same side must be convex face to face in order to be locked together, so, this is the reason why the inner concave surface of the outer wheel is located on the outer side.

In addition to increase beauty, the wheel cover can also reduce wind resistance and achieve the efficiency of oil saving.

The present invention has arisen to mitigate and/or obviate the afore-described disadvantages.

SUMMARY OF THE PRESENT INVENTION

The primary objective of the present invention is to provide an effective technical solution to solve the defect that the wheel of the existing truck or bus's front wheel has failed to install the wheel cover.

To achieve the above objective, a wheel cover unit for front wheels of trucks or buses in accordance with the present invention comprises: a wheel cover, two attaching members and a cover. The wheel cover is provided with an outer convex platform having a central hole in the center thereof, and the periphery of the central hole is annularly provided with a plurality of nut convex covers. The inner edge of the central hole is vertically and backwardly provided with a hole ring having two corresponding pairs of slots. Two pairs of lock tabs are extended from the two pairs of slots respectively to the central hole. Each attaching member is provided with a connecting portion and two connecting pieces. The connecting portion is locked with the bolt of the wheel, the connecting piece is locked with the lock tab by a screwed element, so as to assemble the wheel cover to the front wheel of the truck or bus.

The connecting piece is lower than the connecting portion and is engaged in the slot of the hole ring. When the connecting piece is locked with the lock tab by the screwed element, a distance is formed between the connecting piece and the lock tab, so that the locking tightness can be increased when the screwed element is used.

On the inner side of the outer convex platform is protruded with a plurality of ribs that can increase the structural strength of the wheel cover and reduce the thickness of the wheel cover, saving the material cost.

In addition, in a periphery of the outer convex platform is defined a plurality of through holes, each through hole is backwardly provided with a protruding seat at the inner edge thereof, such that when the wheel cover is assembled to the wheel, the protruding seats can be assembled into the perforating holes of the wheel.

Moreover, a cover ring is backwardly extended from the cover and is defined with a slot corresponding to the lock tab, so that the cover can be engaged in the central hole of the wheel cover. Also, the cover ring of the hole cover is provided with an engaging portion on the bottom side thereof. When the cover is engaged in the central hole, the engaging portion is engaged in the hole ring. The cover ring of the cover also has a plurality of grooves.

To summarize, the lock tabs are added at the central holes of the wheel cover, and by the connection of the attaching member, the wheel cover can be locked to the wheel of the front wheel, and the larger ring cover can also be applied to the front wheel of a large truck or bus, which can ensure the locking stability.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENT

Figure 1:
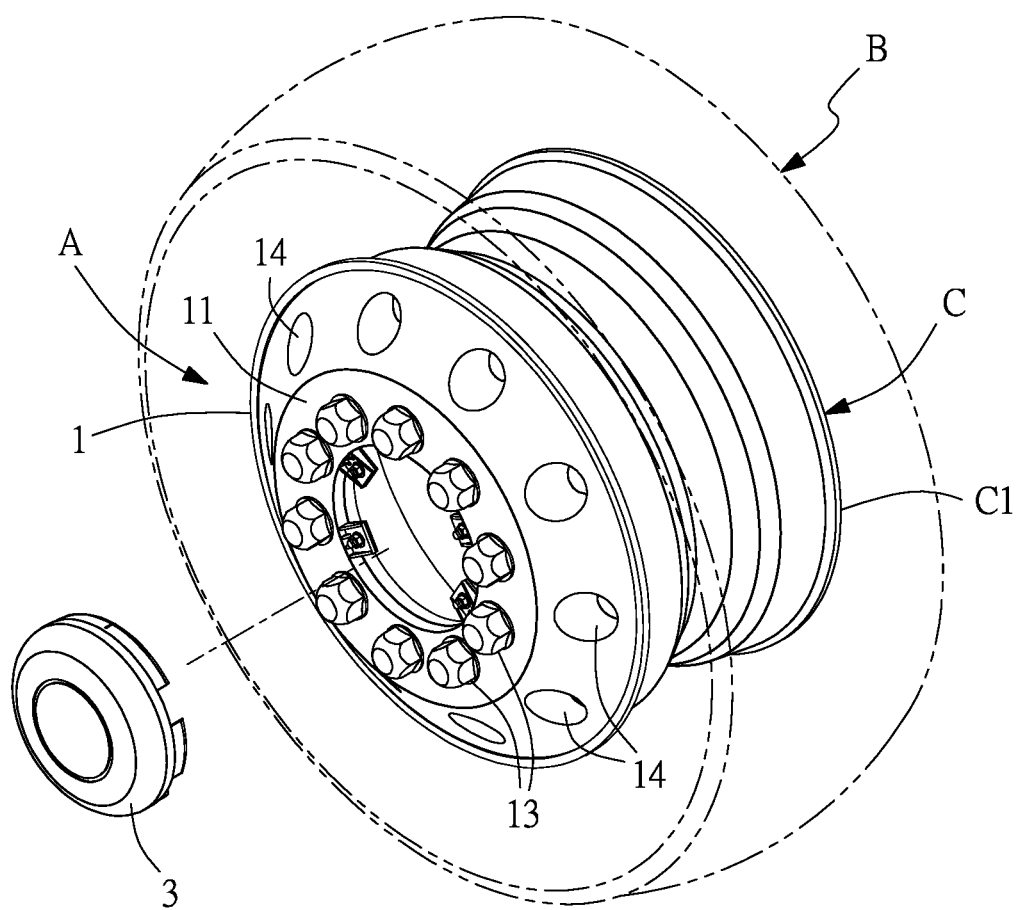
FIG. 1 is a perspective view of a wheel cover unit for front wheels of trucks or buses in accordance with the present invention.
Figure 2:
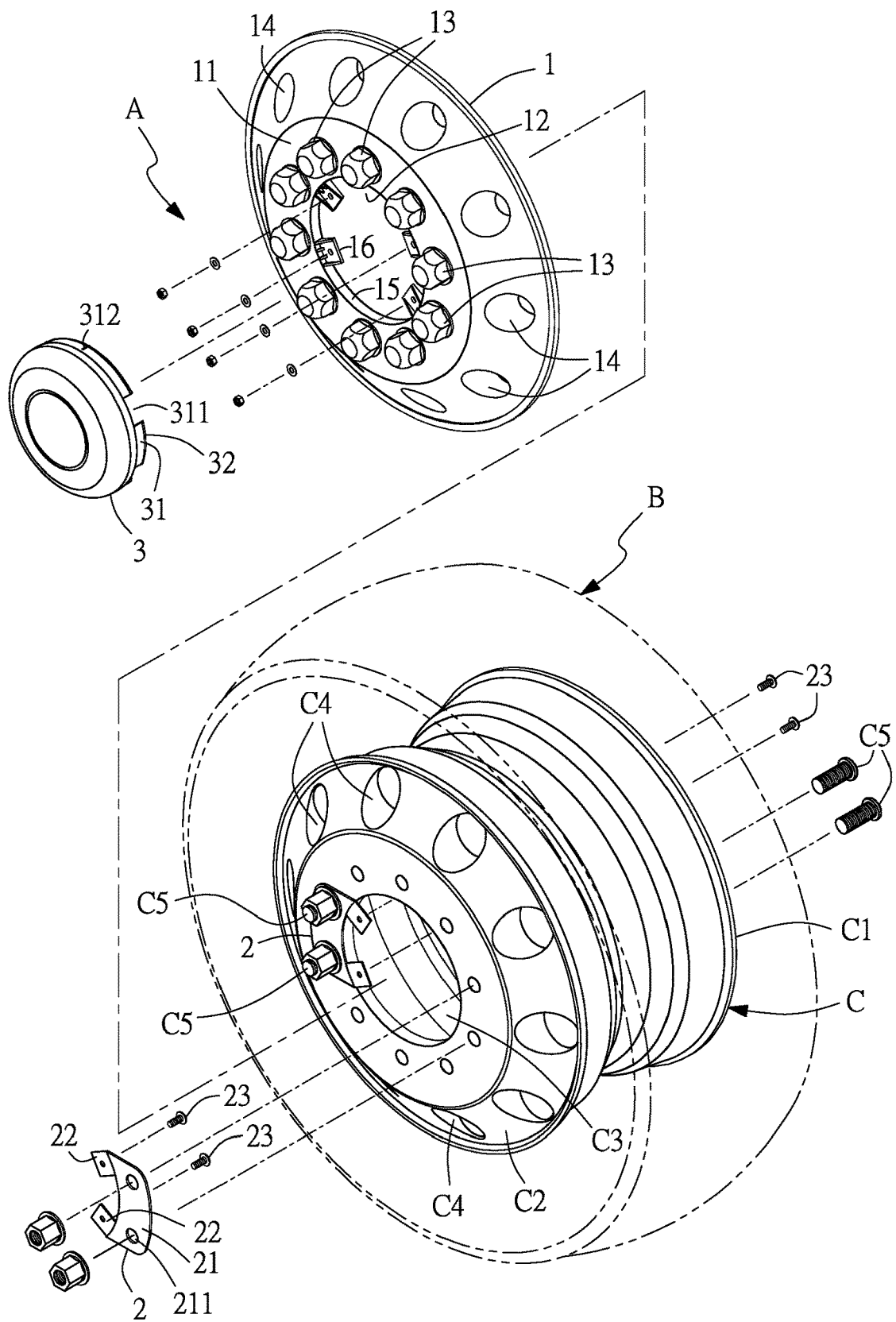
FIG. 2 is an exploded view of the wheel cover unit for front wheels of trucks or buses in accordance with the present invention.
Figure 5:
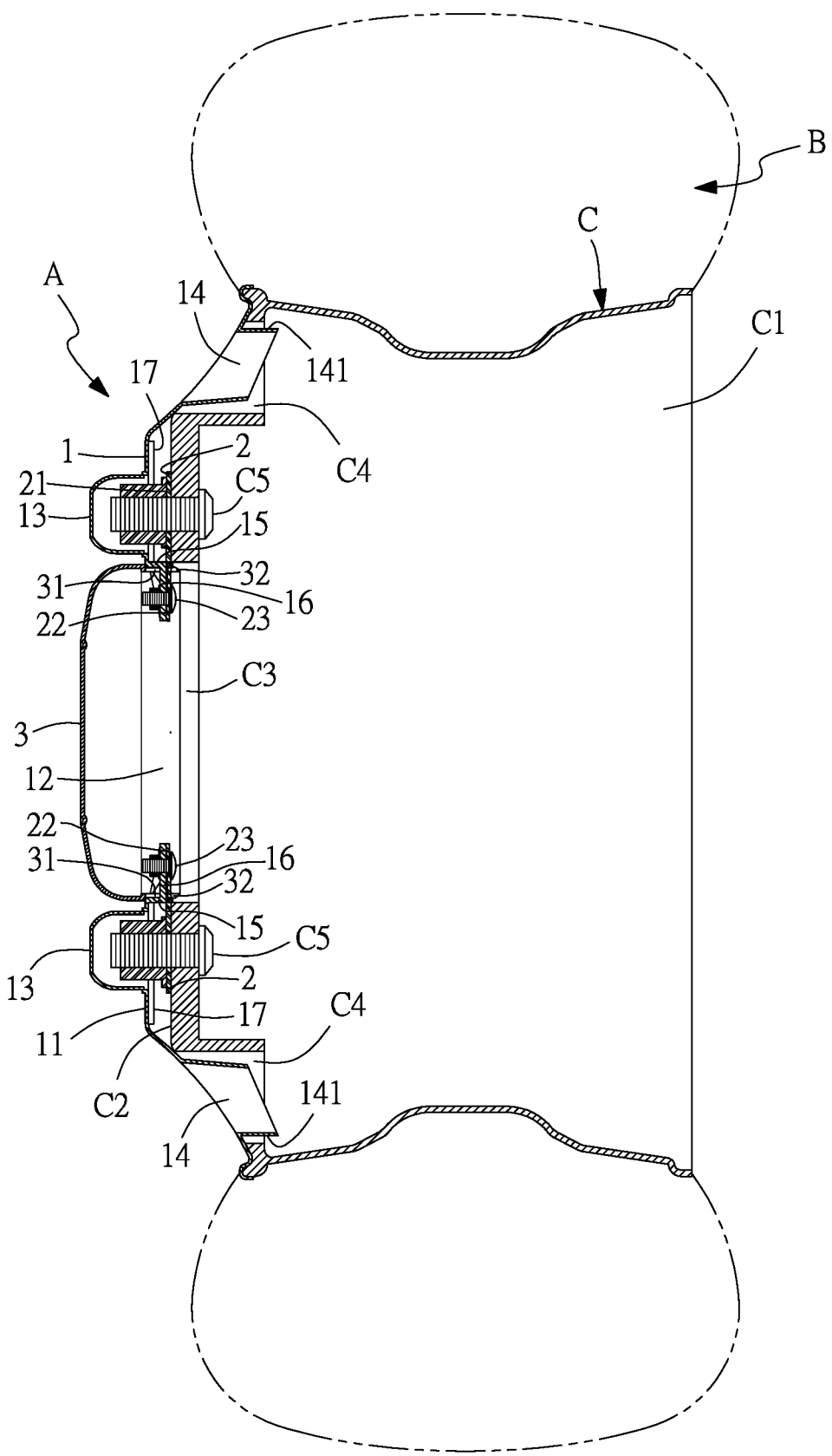
FIG. 5 is an assembly cross sectional view of the wheel cover unit for front wheels of trucks or buses in accordance with the present invention.

Referring to FIG. 1, a wheel cover unit A in accordance with a preferred embodiment of the present invention can be assembled to a wheel C of a front wheel B of a truck or bus as shown in FIG. 2, the wheel C has an inner concave surface C1 (as shown in FIG. 5) and an outer convex surface C2 located on an outer side of the wheel C. The wheel C is defined with an intermediate hole C3 and a plurality of perforating holes C4 on the outer convex surface C2, and between the intermediate hole C3 and the perforating holes C4 is annularly assembled a plurality of bolts C5. The wheel cover unit A includes a wheel cover 1, two attaching members 2 and a cover 3.

Figure 3:
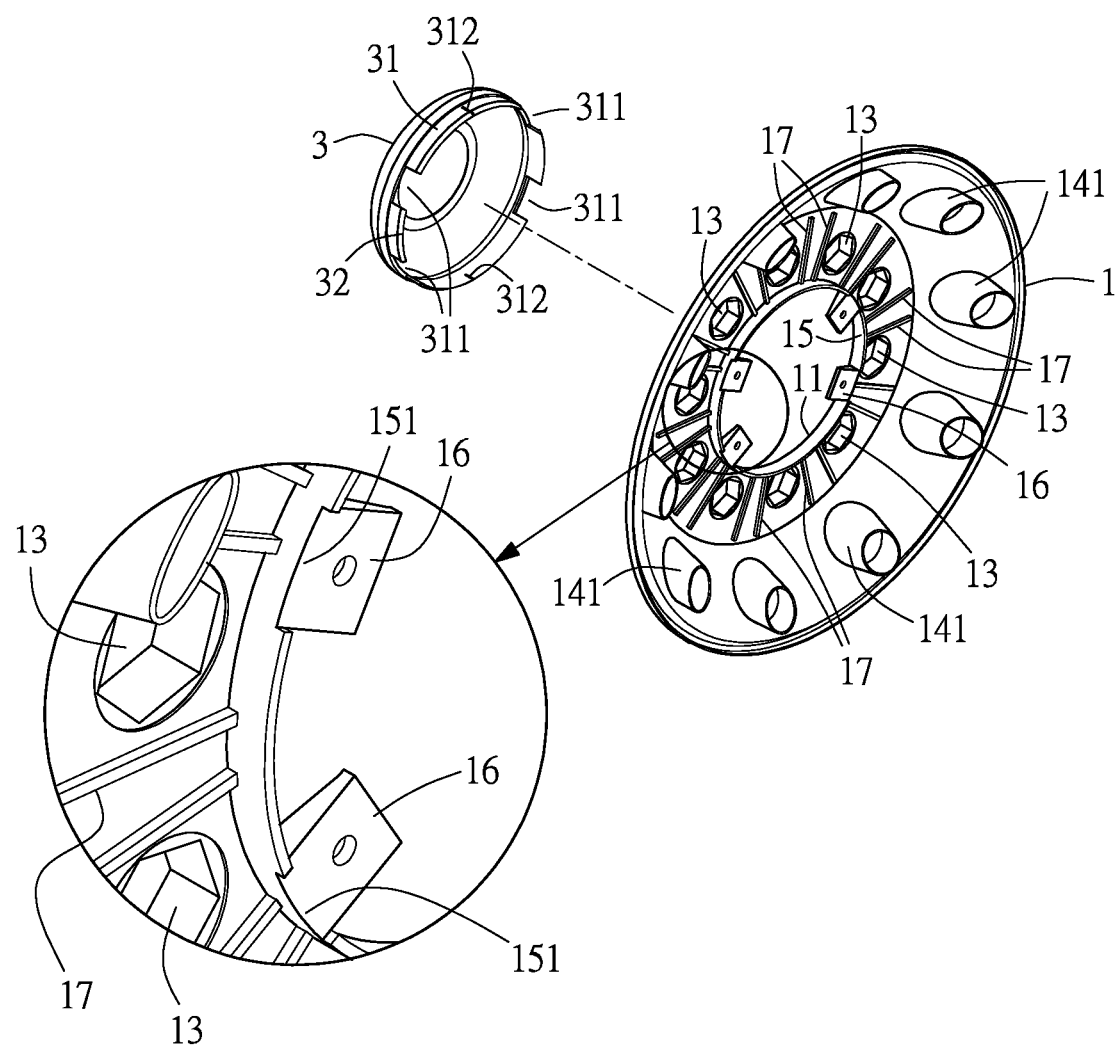
FIG. 3 is a perspective and partial enlarged view of a wheel cover of FIG. 2.
Figure 4:
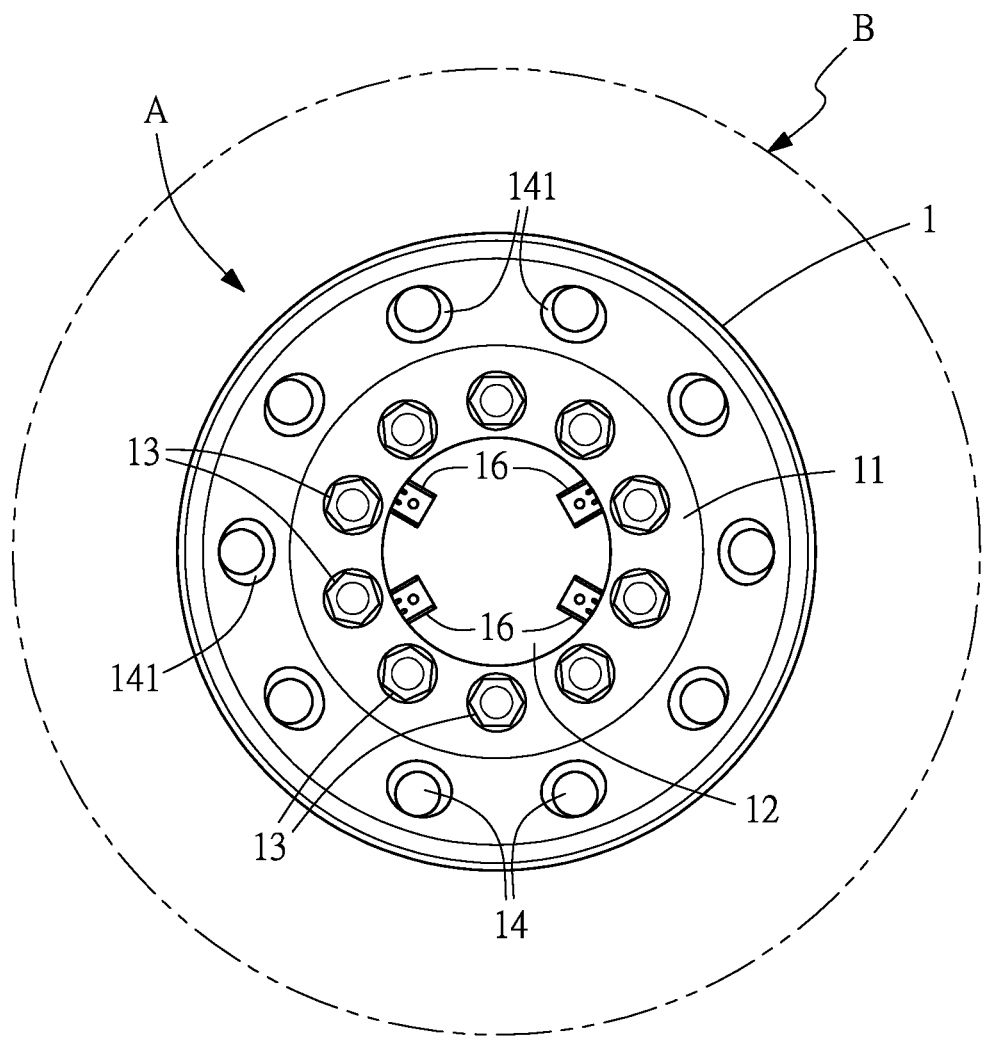
FIG. 4 is a plan view of the wheel cover in accordance with the present invention.
Figure 6:
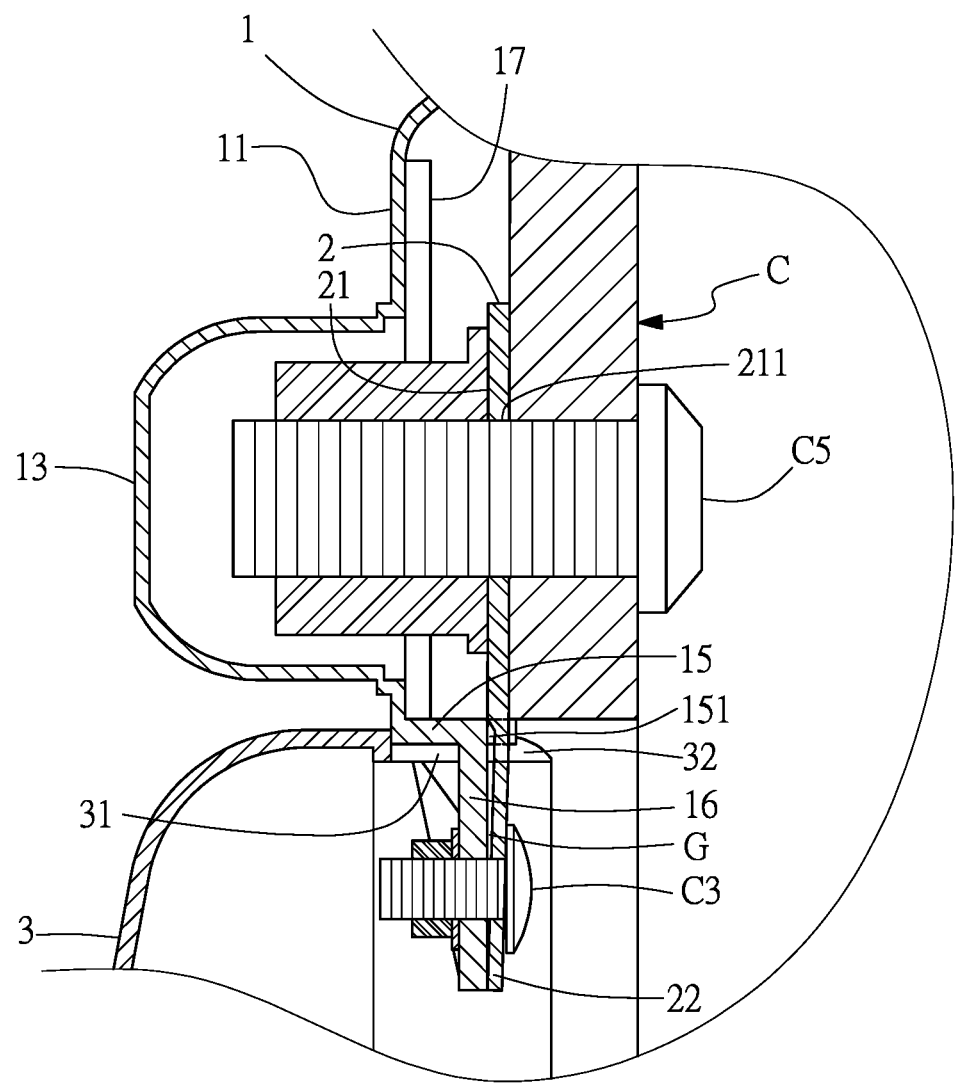
FIG. 6 is a partial enlarged view of the main structure of FIG. 5.

The wheel cover 1 is provided with an outer convex platform 11 having a central hole 12 in the center thereof, and the periphery of the central hole 12 is annularly provided with a plurality of nut convex covers 13. In a periphery of the outer convex platform 11 is defined a plurality of through holes 14, each through hole 14 is backwardly provided with a protruding seat 141 at the inner edge thereof (as shown in FIGS. 3-4), such that when the wheel cover 1 is assembled to the wheel C, the protruding seats 141 can be assembled into the perforating holes C4 of the wheel C (as shown in FIG. 5). In addition, the inner edge of the central hole 12 is vertically and backwardly provided with a hole ring 15 having two corresponding pairs of slots 151 (as shown in FIG. 3). Two pairs of lock tabs 16 are extended from the two pairs of slots 151 respectively to the central hole 12. Viewed from the external side, the lock tab 16 is lower than the edge of the central hole 12 (as shown in FIGS. 5-6) and is vertical to the hole ring 15. Moreover, on the inner side of the outer convex platform 11 is protruded with a plurality of ribs 17 that are located between the nut convex covers 13 (as shown in FIG. 3), the ribs 17 also can increase the structural strength of the wheel cover 1 and reduce the thickness of the wheel cover 1, saving the material cost.

Referring to FIG. 2, each attaching member 2 is provided with a connecting portion 21 and two connecting pieces 22. The connecting portion 21 is defined with a penetrating hole 211 for passing through the bolt C5 of the wheel C, the connecting piece 22 is locked with the lock tab 16 by a screwed element 23, so as to assemble the wheel cover 1 to the wheel C. The connecting piece 22 is lower than the connecting portion 21 and is engaged in the slot 151 of the hole ring 15. When the connecting piece 22 is locked with the lock tab 16 by the screwed element 23, a distance G is formed between the connecting piece 22 and the lock tab 16 (as shown in FIG. 6), so that the locking tightness can be increased when the screwed element 23 is used.

Referring to FIGS. 2-3, a cover ring 31 is backwardly extended from the cover 3 and is defined with a slot 311 corresponding to the lock tab 16 of the wheel cover 1, so that the cover 3 can be engaged in the central hole 12 of the wheel cover 1. Also, the cover ring 31 of the hole cover 3 is provided with an engaging portion 32 on the bottom side thereof. When the cover 3 is engaged in the central hole 12, the engaging portion 32 is engaged in the hole ring 15 (as shown in FIG. 6). The cover ring 31 of the cover 3 also has a plurality of grooves 312, which makes the cover ring 31 have an appropriate elastic margin for engaging in the central hole 12.

In operation, the wheel cover unit A is firstly locked with the C5 of the wheel C of the front wheel B by the connecting portion 21 of the attaching member 2 (as shown in FIGS. 5-6), and then the central hole 12 of the wheel cover 1 is aligned to the intermediate hole C3 of the wheel C and the lock tab 16 is aligned to the connecting piece 22. At that time, since the connecting piece 22 is engaged in the slot 151 of the hole ring 15, and the protruding seat 141 of the wheel cover 1 is fitted in the perforating hole C4 of the wheel C, the lock tab 16 can be locked with the connecting piece 22 by the screwed element 23. In addition, due to the distance G between the connecting piece 22 and the lock tab 16, the locking tightness can be increased when the screwed element 23 is used, which can avoid the movement and the shedding of the wheel cover 1 when driving or the brake stops. Finally, the cover 3 is engaged in the central hole 12, and the engaging portion 32 is engaged in the hole ring 15.

It can be seen from the above structure that main idea of the invention lies in: the lock tabs 16 are added at the central holes 12 of the wheel cover 1, and by the connection of the attaching member 2, the wheel cover 1 can be locked to the wheel C of the front wheel B, and the larger ring cover 1 can also be applied to the front wheel B of a large truck or bus, so that the practicability of the invention is higher. Moreover, the wheel cover 1 and the cover 3 are plastic injection molding, which is light and strong, and more three-dimensional.

While we have shown and described various embodiments in accordance with the present invention, it should be clear to those skilled in the art that further embodiments may be made without departing from the scope of the present invention.

What is claimed is:

1. A wheel cover unit for front wheels of trucks or buses, comprising: a wheel cover, two attaching members and a cover, the wheel cover being provided with an outer convex platform having a central hole, a periphery of the central hole being annularly provided with a plurality of nut convex covers, an inner edge of the central hole being vertically and backwardly provided with a hole ring having two corresponding pairs of slots, two pairs of lock tabs being extended from the two pairs of slots respectively to the central hole, each of the attaching members being provided with a connecting portion and two connecting pieces, the connecting portion being locked with the bolt of the wheel, and the connecting piece being locked with the lock tab by a screwed element.

2. The wheel cover unit as claimed in claim 1, wherein the connecting piece which is lower than the connecting portion is engaged in the slot of the hole ring, wherein when the connecting piece is locked with the lock tab by the screwed element, a distance is formed between the connecting piece and the lock tab.

3. The wheel cover unit as claimed in claim 2, wherein a plurality of ribs is protruded on an inner side of the outer convex platform.

4. The wheel cover unit as claimed in claim 2, wherein a plurality of through holes is defined in a periphery of the outer convex platform, wherein a protruding seat is backwardly provided at an inner edge of each of the through holes.

5. The wheel cover unit as claimed in claim 4, wherein a cover ring is backwardly extended from the cover and a slot is defined corresponding to the lock sheet, so that the cover is engaged in the central hole of the wheel cover.

6. The wheel cover unit as claimed in claim 5, wherein an engaging portion is provided on a bottom side of the cover ring of the hole cover, wherein when the cover is engaged in the central hole, the engaging portion is engaged in the hole ring.

7. The wheel cover unit as claimed in claim 6, wherein the cover ring of the cover has a plurality of grooves.

* * * * *